United States Patent
Latta et al.

(10) Patent No.: US 8,994,718 B2
(45) Date of Patent: Mar. 31, 2015

(54) SKELETAL CONTROL OF THREE-DIMENSIONAL VIRTUAL WORLD

(75) Inventors: Stephen Latta, Seattle, WA (US); Darren Bennett, Mercer Island, WA (US); Kevin Geisner, Seattle, WA (US); Relja Markovic, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 823 days.

(21) Appl. No.: 12/975,086

(22) Filed: Dec. 21, 2010

(65) Prior Publication Data

US 2012/0157203 A1 Jun. 21, 2012

(51) Int. Cl.
*G06T 15/00* (2011.01)
*G06F 3/00* (2006.01)
*G06T 13/40* (2011.01)
*G06F 3/01* (2006.01)
*G06F 3/03* (2006.01)
*G06F 3/0486* (2013.01)

(52) U.S. Cl.
CPC ............... *G06F 3/005* (2013.01); *G06T 13/40* (2013.01); *G06F 3/011* (2013.01); *G06F 3/017* (2013.01); *G06F 3/0304* (2013.01); *G06F 3/0486* (2013.01); *G06F 2203/04806* (2013.01)
USPC ........................................................ 345/419

(58) Field of Classification Search
CPC ......... G06F 3/011; G06F 3/017; G06F 3/014; G06F 3/01; A63F 2300/8082; G06T 13/40; G06K 9/00355; G06K 9/00335
USPC ........................................................ 345/419
See application file for complete search history.

(56) References Cited

U.S. PATENT DOCUMENTS

| | | | |
|---|---|---|---|
| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

(Continued)

*Primary Examiner* — Kee M Tung
*Assistant Examiner* — Haixia Du
(74) *Attorney, Agent, or Firm* — Miia Sula; Judy Yee; Micky Minhas

(57) ABSTRACT

A virtual skeleton includes a plurality of joints and provides a machine readable representation of a human target observed with a three-dimensional depth camera. A relative position of a hand joint of the virtual skeleton is translated as a gestured control, and a three-dimensional virtual world is controlled responsive to the gestured control.

15 Claims, 14 Drawing Sheets

(56) References Cited

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,646,394 B1 | 1/2010 | Neely et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |

(56) References Cited

U.S. PATENT DOCUMENTS

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2007/0110298 | A1 | 5/2007 | Graepel et al. |
| 2007/0259717 | A1 | 11/2007 | Mattice et al. |
| 2008/0013826 | A1 | 1/2008 | Hillis et al. |
| 2008/0026838 | A1 | 1/2008 | Dunstan et al. |
| 2010/0295781 | A1* | 11/2010 | Alameh et al. ............... 345/158 |
| 2012/0013529 | A1* | 1/2012 | McGibney et al. ........... 345/156 |
| 2012/0030569 | A1* | 2/2012 | Migos et al. .................. 715/702 |
| 2013/0038601 | A1* | 2/2013 | Han et al. ..................... 345/419 |

FOREIGN PATENT DOCUMENTS

| | | |
|---|---|---|
| JP | 08044490 A1 | 2/1996 |
| KR | 20100121420 A | 11/2010 |
| TW | 543323 B | 7/2003 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Leikas, et al., "Virtual Space Computer Games with a Floor Sensor Control", Retrieved at << http://citeseer.ist.psu.edu/viewdoc/download?doi=10.1.1.21.8806&rep=rep1&type=pdf >>,2000, pp. 119-122.

Bowman, et al., "An Evaluation of Techniques for Grabbing and Manipulating Remote Objects in Immersive Virtual Environments", Retrieved at << http://citeseerx.ist.psu.edu/viewdoc/download?doi=10.1.1.54.9770&rep=rep1&type=pdf >>,1997, pp. 4.

Valli, Alessandro, "Natural Interaction White Paper", Retrieved at << http://www.naturalinteraction.org/files/whitepaper.pdf >>,2007, pp. 21.

Takase, et al., "Gestural Interface and the Intuitive Interaction with Virtual Objects", Retrieved at << http://ieeexplore.ieee.org/stamp/stamp.jsp?arnumber=05334380 >>,, International Joint Conference, Aug. 18-21, 2009, pp. 3260-3263.

State Intellectual Property Office of China, Office Action of Chinese Patent Application No. 201110430789.0, Feb. 24, 2014, 6 pages.

State Intellectual Property Office of the People's Republic of China, Second Office Action Received for China Patent Application No. 201110430789.0, Jul. 21, 2014, 17 Pages.

\* cited by examiner

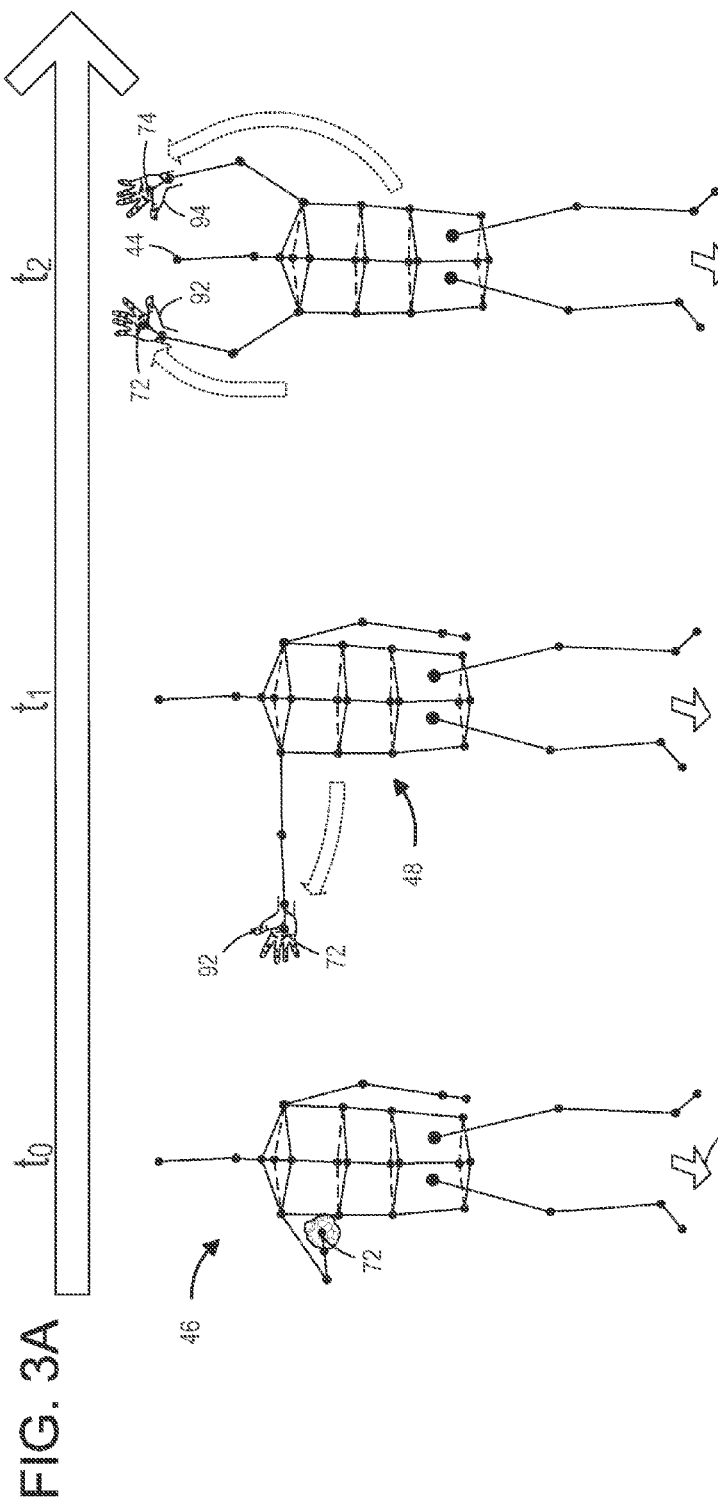

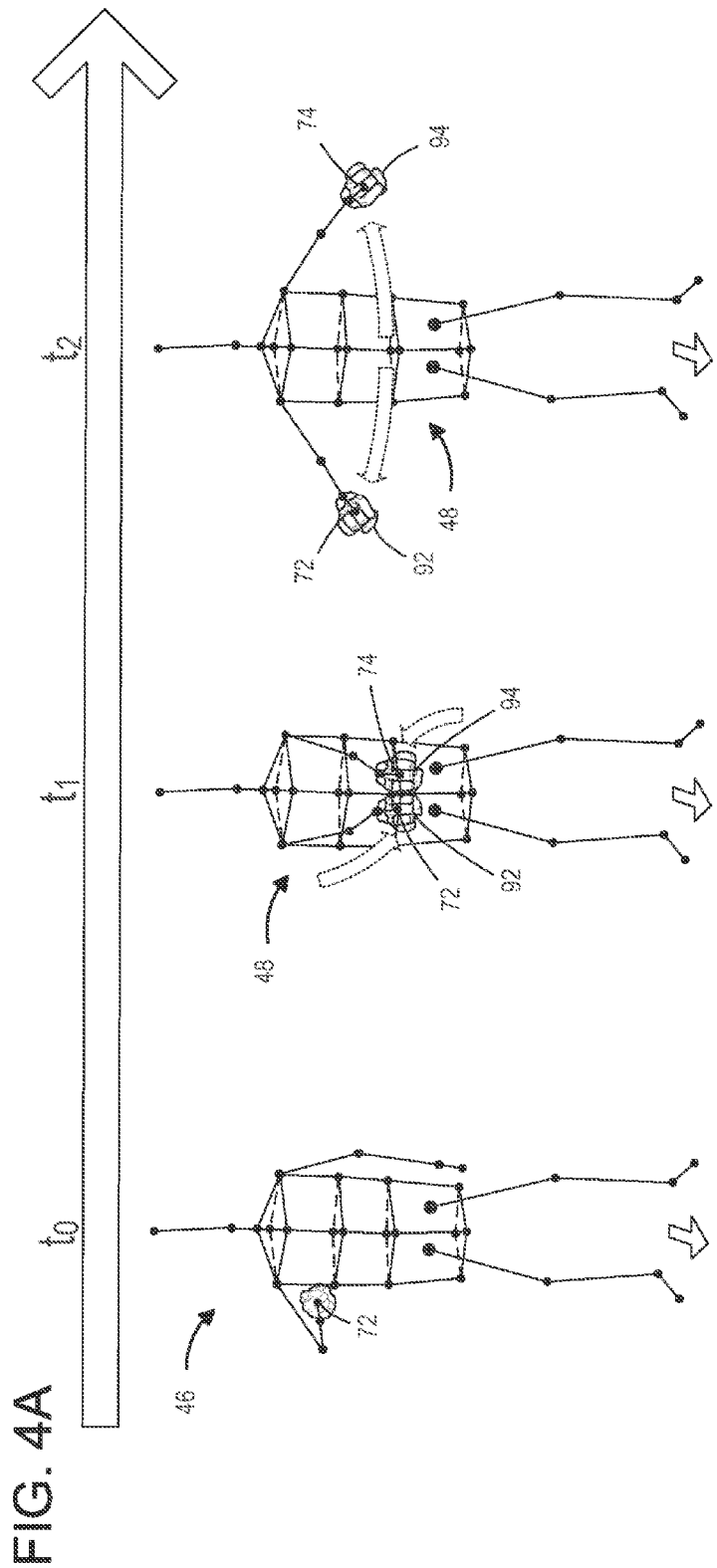

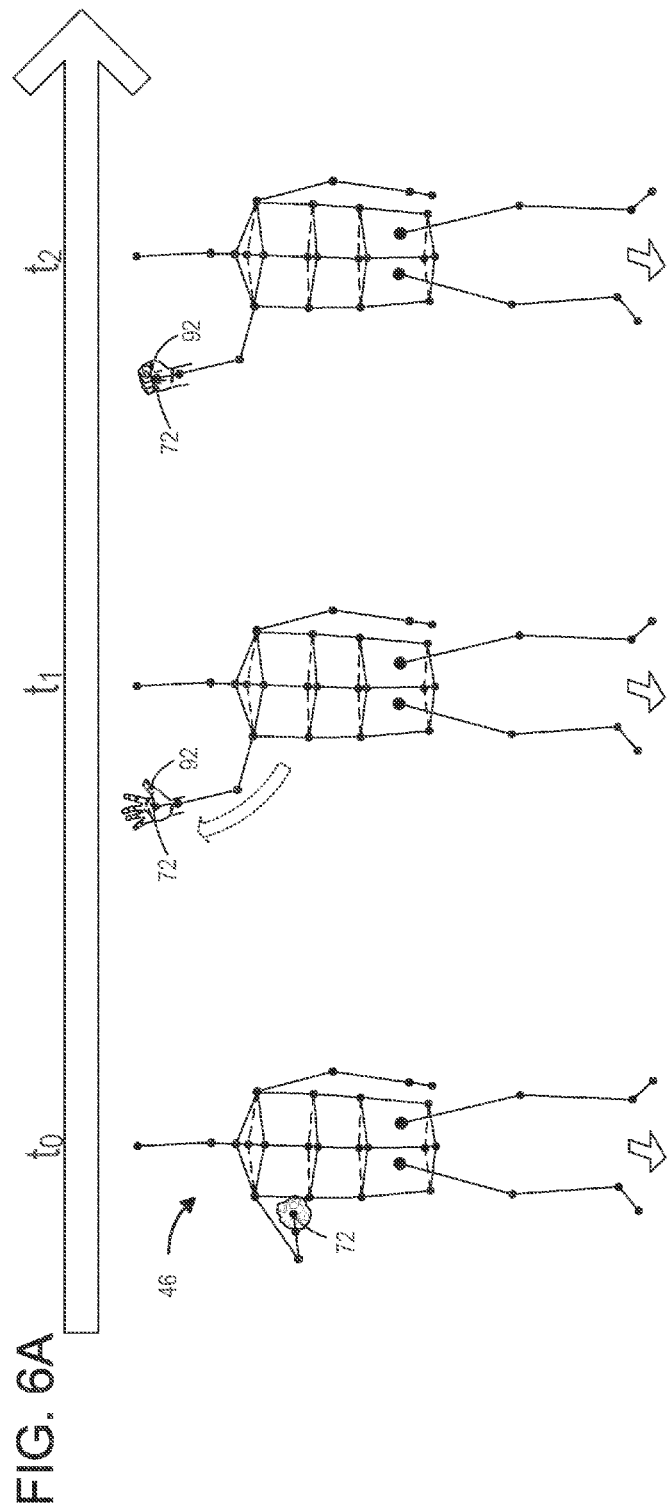
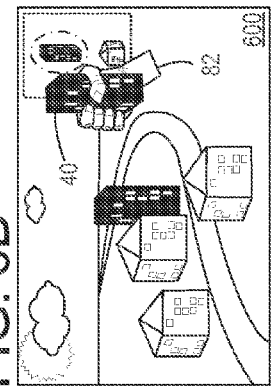
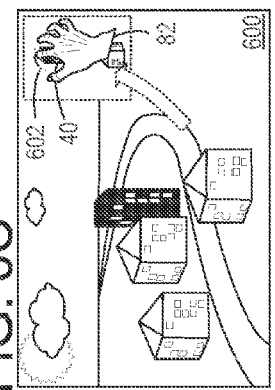
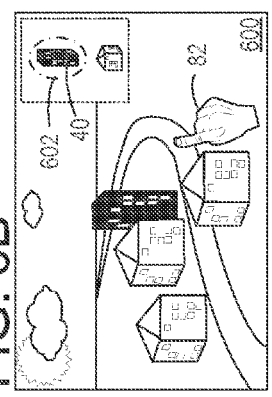

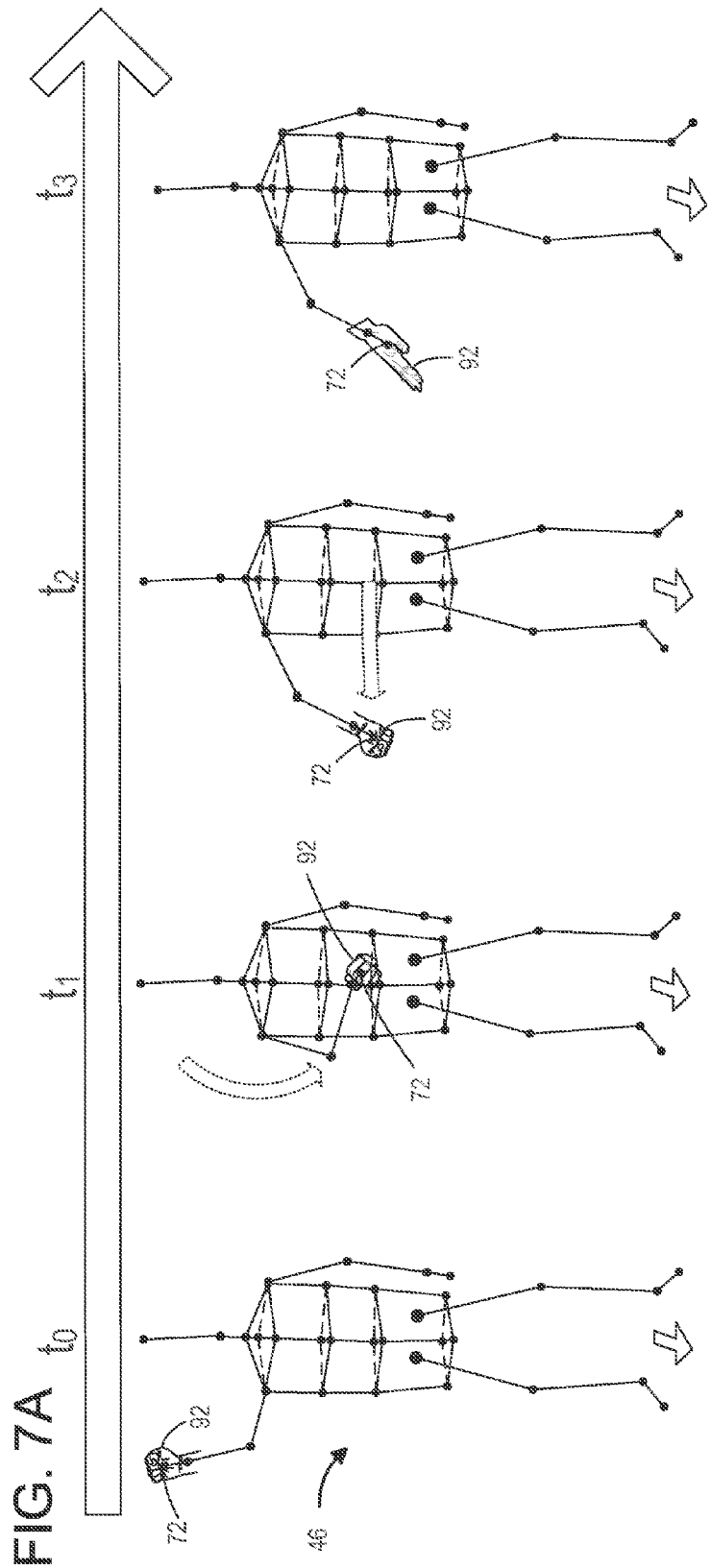

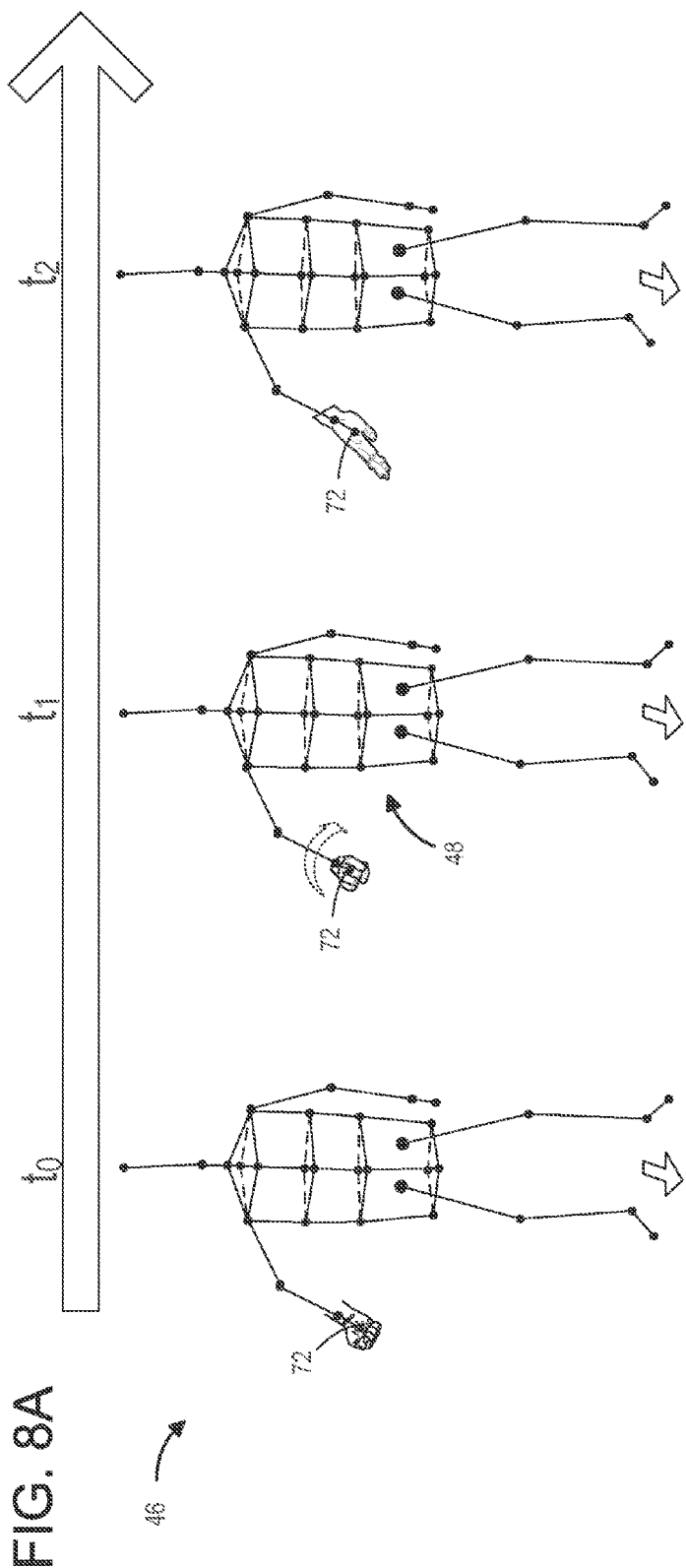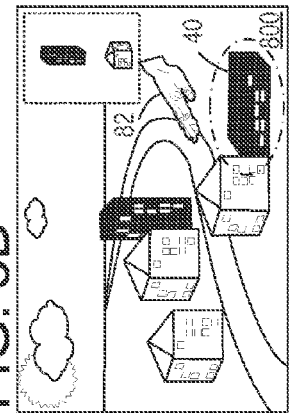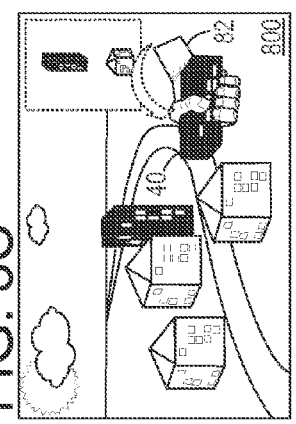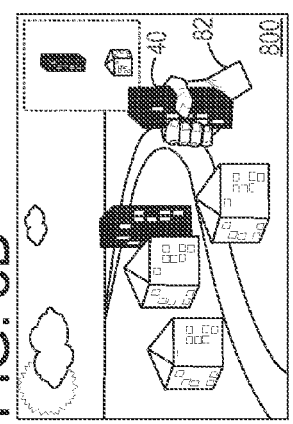

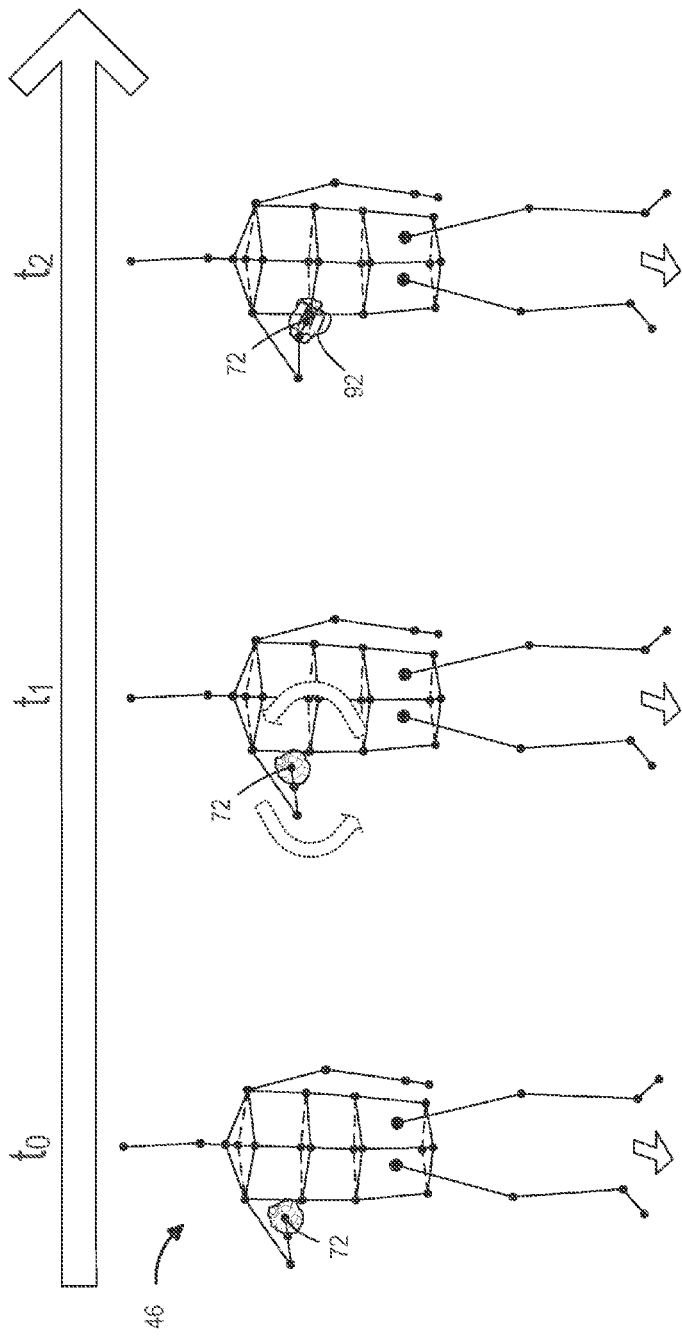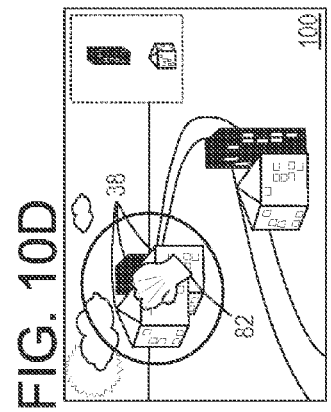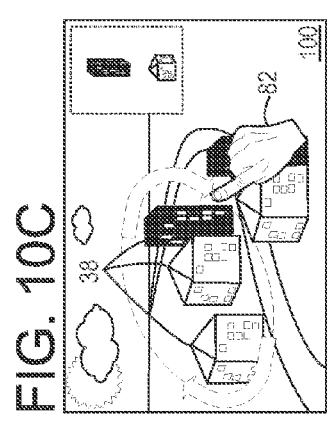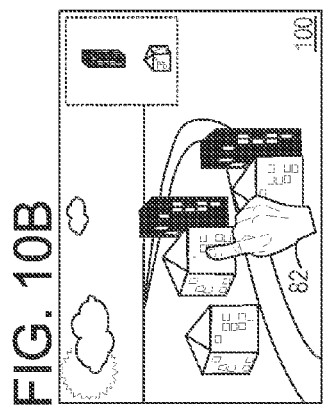

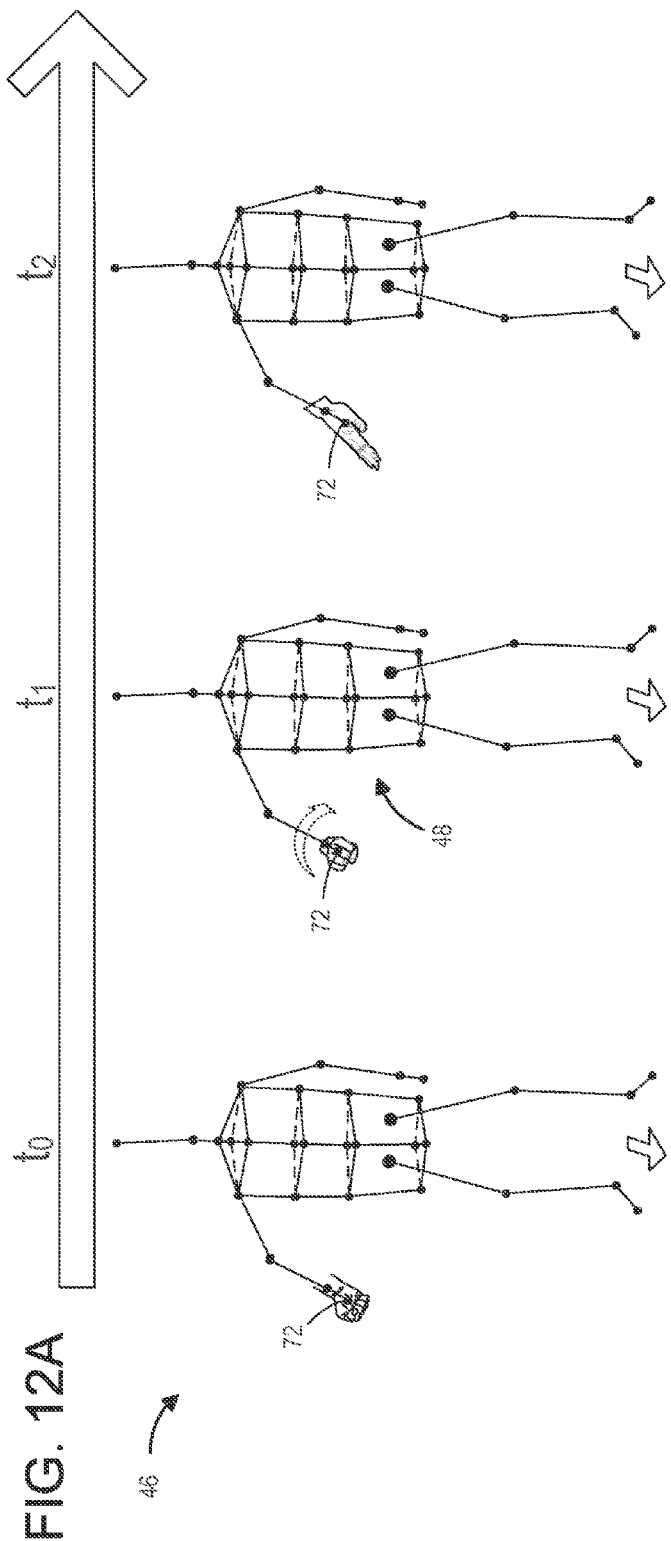
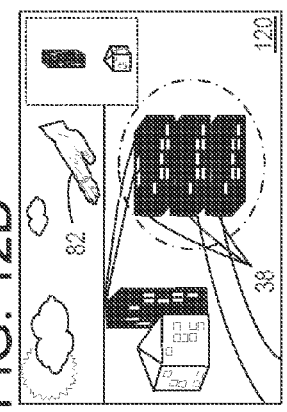
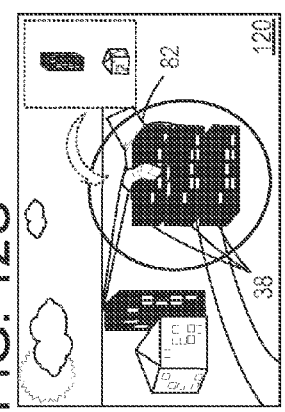
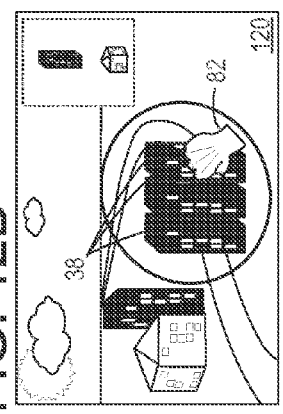

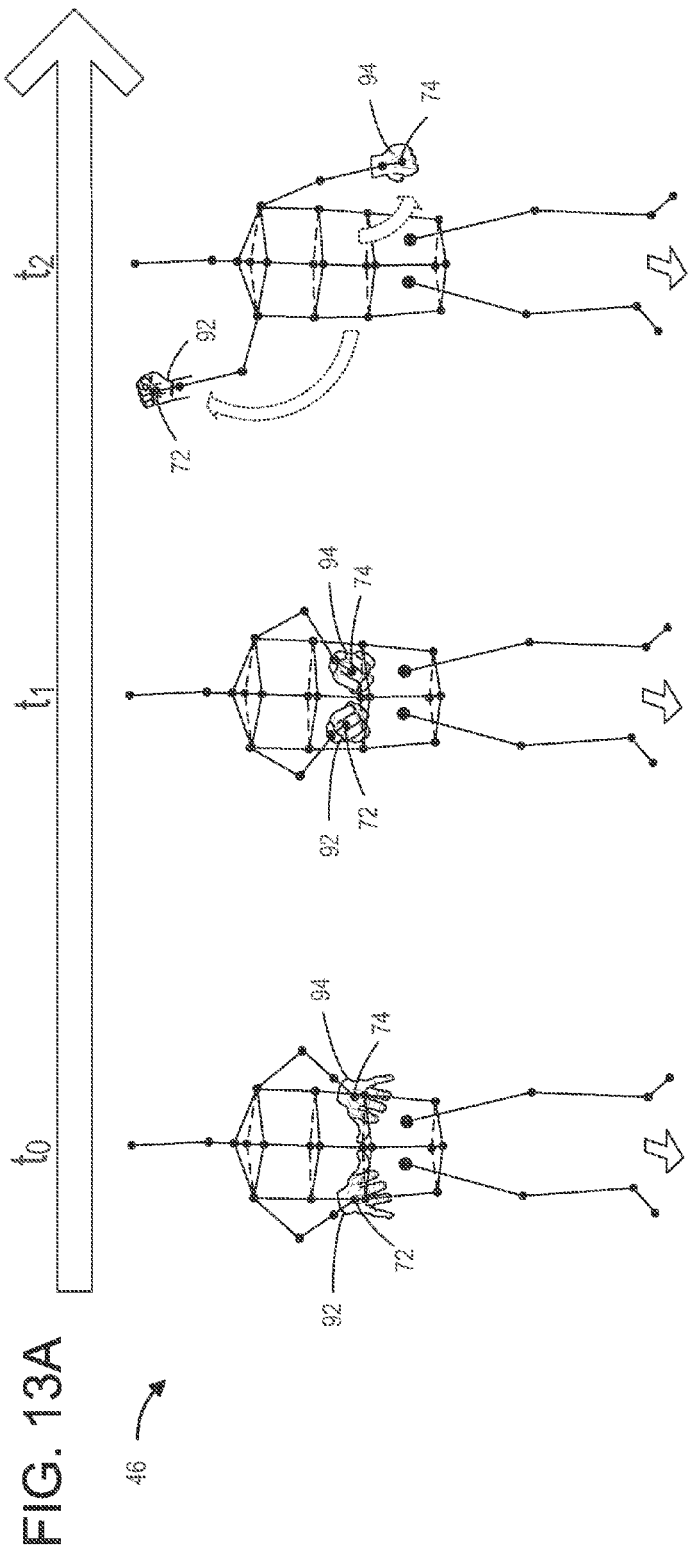

SKELETAL CONTROL OF THREE-DIMENSIONAL VIRTUAL WORLD

BACKGROUND

While camera technology allows images of humans to be recorded, computers may have difficulty using such images to accurately assess how a human is moving within the images. Recently, technology has advanced such that some aspects of a human's movements may be interpreted with the assistance of special cameras and tracking tags. For example, an actor may be carefully adorned with several tracking tags (e.g., retro-reflectors) that can be tracked with several cameras from several different positions, Triangulation can then be used to calculate the three-dimensional position of each reflector. Because the tags are carefully positioned on the actor, and the relative position of each tag to a corresponding part of the actors body is known, the triangulation of the tag position can be used, to infer the position of the actor's body. However, this technique requires special reflective tags, or other markers, to be used.

In science fiction movies, computers have been portrayed as intelligent enough to actually view human beings and interpret the motions and gestures of the human beings without the assistance of reflective tags or other markers. However, such scenes are created using special effects in which an actor carefully plays along with a predetermined movement script that makes it seem as if the actor is controlling the computers scripted actions. The actor is not actually controlling the computer, but rather attempting to create the illusion of control.

SUMMARY

According to one aspect of the disclosure, a virtual skeleton includes a plurality of joints and provides a machine readable representation of a human target observed with a three-dimensional depth camera. A relative position of a hand joint of the virtual skeleton is translated as a gestured control, and a three-dimensional virtual world is controlled responsive to the gestured control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3-13 somewhat schematically show gestured god game controls as translated from a virtual skeleton.

DETAILED DESCRIPTION

A depth-image analysis system, such as a 3D-vision gaming system, may include a depth camera capable of observing one or more players. As the depth camera captures images of a player within an observed scene, those images may be interpreted and modeled with one or more virtual skeletons. As described in more detail below, the virtual skeletons may be used as an input for controlling a three-dimensional virtual gaming world, such as a god game. In other words, a depth camera can observe and model a human that is performing gestures designed to control all aspects of the three-dimensional virtual gaming world, and the human target can be modeled with a virtual skeleton that the god game can interpret as different controls. In this way, the human can control the three-dimensional virtual gaming world with gestures alone, avoiding conventional keyboards, mice, track pads, and other controllers.

Figure 1:
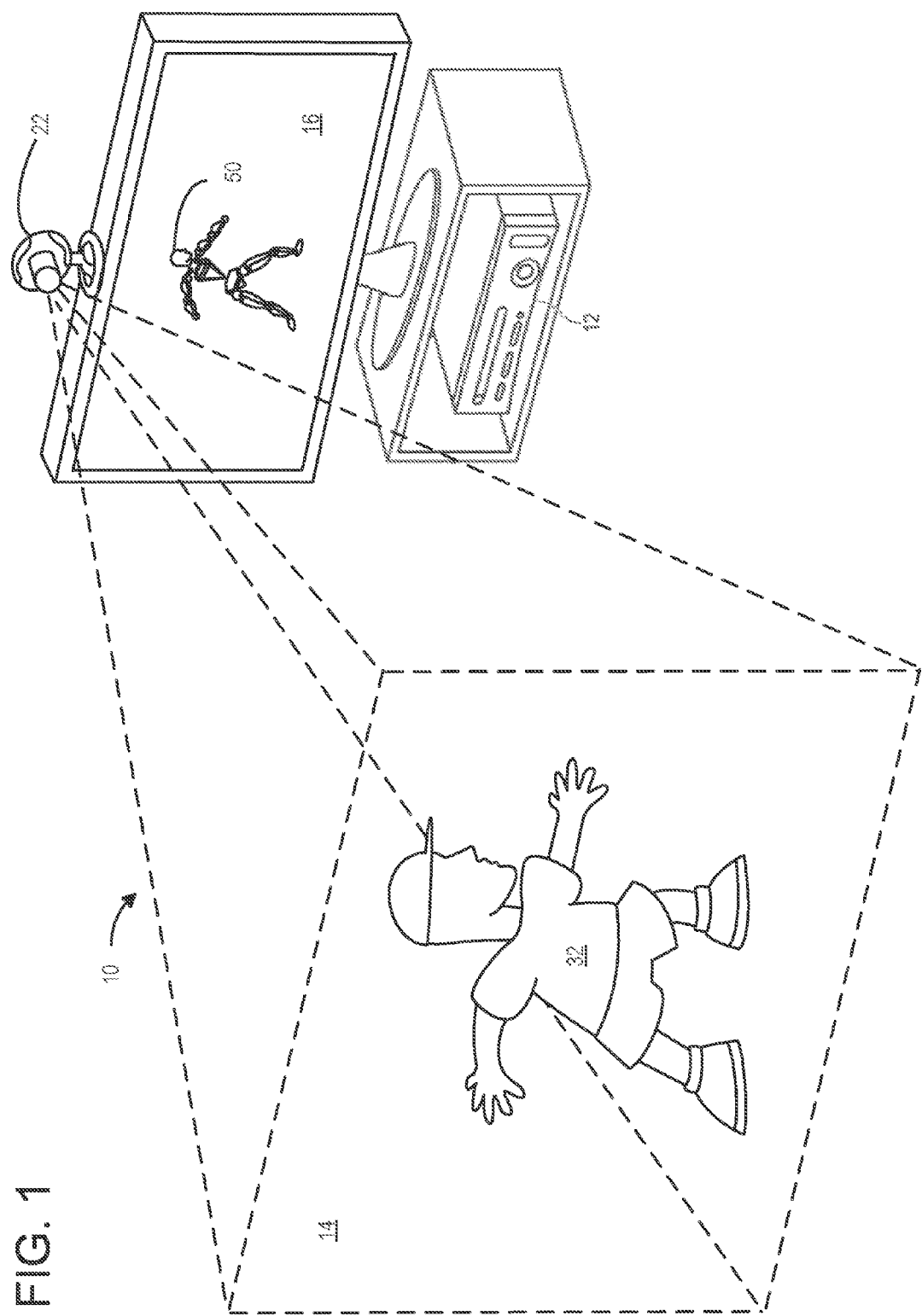
FIG. 1 shows a depth-image analysis system viewing an observed scene, in accordance with an embodiment of the present disclosure.

FIG. 1 shows a non-limiting example of a depth-image analysis system 10. In particular, FIG. 1 shows a gaming system 12 that may be used to play a variety of different games, play one or more different media types, and/or control or manipulate non-game applications and/or operating systems. FIG. 1 also shows a display device 16, such as a television or a computer monitor, which may be used to present game visuals to game players. As one example, display device 16 may be used to visually present a virtual avatar 50 that human target 32 controls with his or her movements. The depth-image analysis system 10 may include a capture device, such as a depth camera 22, that visually monitors or tracks human target 32 within an observed scene 14. Depth camera 22 is discussed in greater detail with respect to FIGS. 2 and 14.

Human target 32 is shown here as a game player within observed scene 14. Human target 32 is tracked by depth camera 22 so that the movements of human target 32 may be interpreted by gaming system 12 as controls that can be used to affect the game being executed by gaming system 12. In other words, human target 32 may use his or her movements to control the game. The movements of human target 32 may be interpreted as virtually any type of game control. Some movements of human target 32 may be interpreted as controls that serve purposes other than controlling virtual avatar 50. As non-limiting examples, movements of human target 32 may be interpreted as controls that steer a virtual racing car, shoot a virtual weapon, navigate a first-person perspective through a virtual, world, or manipulate various aspects of a simulated world. Movements may also be interpreted, as auxiliary game management controls. For example, human target 32 may use movements to end, pause, save, select a level, view high scores, communicate with other players, etc.

Depth camera 22 may also be used to interpret target movements as operating system and/or application controls that are outside the realm of gaming. Virtually any controllable aspect of an operating system and/or application may be controlled by movements of a human target 32. The illustrated scenario in FIG. 1 is provided as an example, but is not meant to be limiting in any way. On the contrary, the illustrated scenario is intended to demonstrate a general concept, which may be applied to a variety of different applications without departing from the scope of this disclosure, The methods and processes described herein may be tied to a variety of different types of computing systems. FIG. 1 shows a non-limiting example in the form of gaming system 12, display device 16, and depth camera 22. In general, a depth-image analysis system may include a computing system 60, shown in simplified form in FIG. 14, which will be discussed in greater detail below.

Figure 2:
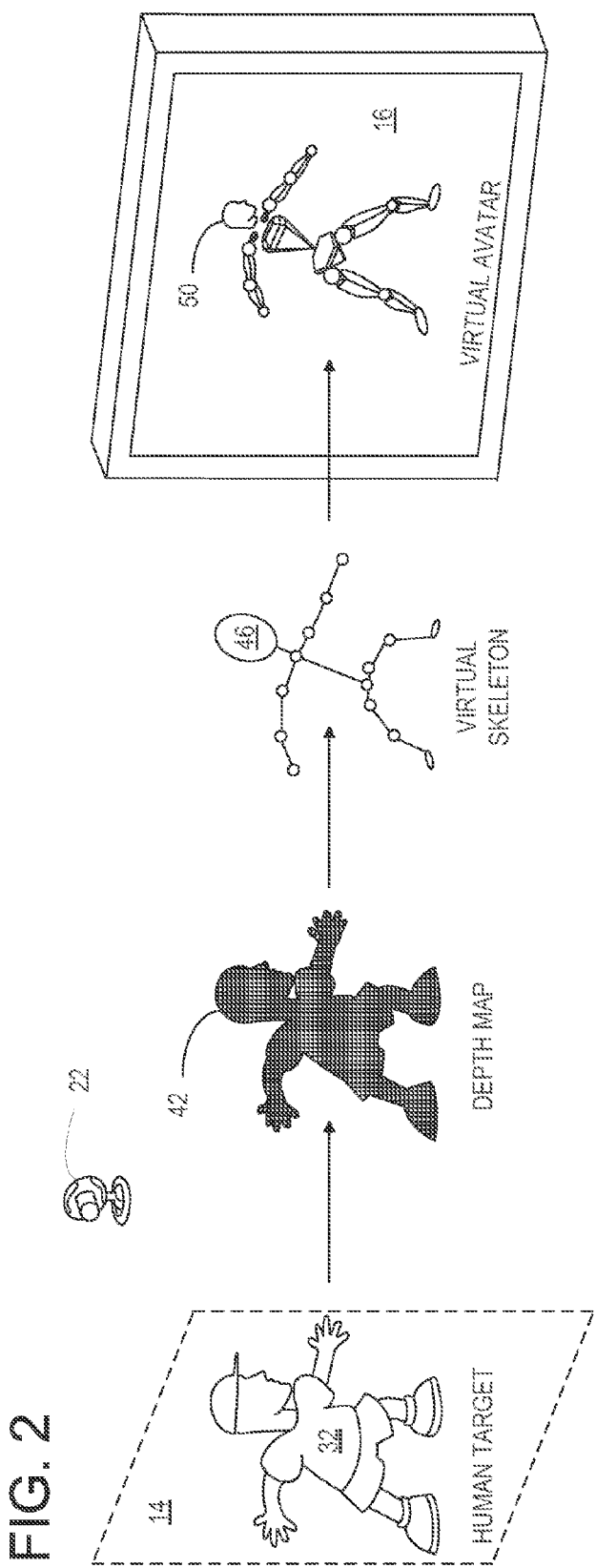
FIG. 2 somewhat schematically shows the modeling of a human target with, a virtual skeleton.

FIG. 2 shows a simplified processing pipeline in winch human target 32 in an observed scene 14 is modeled, as a virtual, skeleton 48 that can be used to draw a virtual avatar 50 on display device 16 and/or serve as a control input for controlling other aspects of a game, application, and/or operating system. It will be appreciated, that a processing pipeline may include additional steps and/or alternative steps than those depicted in FIG. 2 without departing from the scope of this disclosure.

As shown in FIG. 2, human target 32 and the rest of observed scene 14 may be imaged by a capture device such, as depth camera 22. The depth camera may determine, for each pixel, the depth of a surface in the observed scene relative to the depth camera. Virtually any depth finding technology may be used without departing from the scope of this disclosure. Example depth finding technologies are discussed in more detail with reference to capture device 68 of FIG. 14.

Returning now to FIG. 2, the depth information determined for each pixel may be used to generate a depth map 42. Such a depth map may take the form of virtually any suitable data structure, including but not limited to a matrix that includes a depth value for each pixel of the observed scene. In FIG. 2, depth map 42 is schematically illustrated as a pixelated grid of the silhouette of human target 32. This illustration is for simplicity of understanding, not technical accuracy. It is to be understood that a depth map generally includes depth information for all pixels, not just pixels that correspond to the human target 32, and that tire perspective of depth camera 22 may not result in the silhouette depicted in FIG. 2.

Virtual skeleton 46 may be derived from depth map 42 to provide a machine readable representation of human target 32. In other words, virtual skeleton 46 is derived from depth map 42 to model human target 32. The virtual skeleton 46 may be derived from the depth map in any suitable manner. In some embodiments, one or more skeletal fitting algorithms may be applied to the depth map. The present disclosure is compatible with virtually any skeletal modeling technique.

The virtual skeleton 46 may include a plurality of joints, each joint corresponding to a portion of the human target. In FIG. 2, virtual skeleton 46 is illustrated as a fifteen-joint stick figure. This illustration is for simplicity of understanding, not technical accuracy. Virtual skeletons in accordance with the present disclosure may include virtually any number of joints, each of winch can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and at least one rotation for each joint). In some embodiments, other types of virtual skeletons may be used (e.g., a wireframe, a set of shape primitives, etc).

As shown in FIG. 2, a virtual avatar 50 may be rendered on display device 16 as a visual representation of virtual skeleton 46. Because virtual skeleton 46 models human target 32, and because the rendering of the virtual avatar 50 is based on the virtual skeleton 46, the virtual avatar 50 serves as a viewable digital representation of the human target 32. As such, the movement of virtual avatar 50 on display device 16 reflects the movements of human target 32.

In some embodiments, only portions of a virtual avatar will be presented on display device 16. As one non-limiting example, display device 16 may present a first person perspective to human target 32 and may therefore present the portions of the virtual avatar that could be viewed through the virtual eyes of the virtual avatar (e.g., outstretched hands holding a steering wheel, outstretched arms holding a rifle, outstretched hands grabbing an object in a three-dimensional virtual world, etc).

While virtual avatar 50 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

As introduced above, a god game may be controlled by the movements of a human target via the skeletal modeling of a depth map. For example, FIGS. 3-13 schematically show a virtual skeleton 46 modeling different gestures of a human target at different moments in time (e.g., time $t_0$, time $t_1$, and time $t_2$). As discussed above, virtual skeleton 48 can be derived from depth information acquired from a depth camera observing the human target. While virtual skeleton 46 is illustrated as a jointed stick figure, it is to be understood that the virtual skeleton may be represented by any suitable machine readable data structure. For example, the joints illustrated as dots in FIG. 3A may be represented by positional coordinates and/or other machine readable information. As such, a logic subsystem of a computing system may receive the virtual skeleton (i.e., data structure(s) representing the virtual skeleton in machine readable form) and process the position and/or other attributes of one or more joints. In this way, the skeletal position/movement, and therefore the gestures of the modeled human target, may be interpreted as different gestured controls for controlling the computing system. While a god game is used as an illustrative example, it will be understood that the gesture interpretation described herein may be applied to any multidimensional virtual environment.

As a first example, FIG. 3A shows virtual skeleton 46 facing a neutral direction—represented by arrow 36. For example, the neutral direction may be towards the depth camera along an optical axis of the depth camera. At time $t_0$, the right arm, including a right hand joint 72, of the virtual skeleton is raised, and extends in the neutral direction. Such a position may be translated as a neutral gestured control. For example, FIG. 3B shows a three-dimensional (3D) virtual gaming world interface 300 that may be presented to a game player via a display device (e.g. display device 16 of FIG. 1). As shown in FIG. 3B, which corresponds to time to of FIG. 3A, a right control cursor 82 may be modeled by right hand joint 72. It will be understood, that references to "left," "right," "front," "back," and the like may be based on the anatomy of the virtual skeleton.

Right control cursor 82, as well as additional and/or alternative control cursors of the 3D virtual gaming world, may be located in a screen space position 302 of a display device (e.g. display device 16 of FIG. 1). The screen space position 302 may be characterized using a Cartesian coordinate system including an x axis and a y axis, for example. Screen space position may track a position of right hand joint 72 of virtual skeleton 46 as modeled from a world space position of a corresponding right hand of a human target (e.g. human target 32 of FIG. 1). FIG. 3B shows right control cursor 82 at screen space position 302 corresponding to a neutral position. Screen space position 302 may align with a centroid of the control cursor, for example. While the Cartesian coordinate axes are shown in FIG. 3B, such axes may be hidden from view and not shown in a 3D virtual gaming world interface. It will be appreciated that a left control cursor may additionally or alternatively track a position of a left hand joint of the virtual skeleton as modeled from a world space position of a corresponding left hand of a human target. For example, as shown in FIG. 3A at time $t_1$, the virtual skeleton 46 moves the right arm including right hand joint 72 up and to the right such that right hand joint 72 extends away from torso 48. This may be interpreted as a scrolling gesture. As such, the screen space position 302 of right control cursor 82 may respond by tracking right hand joint 72 and reaching a scrolling threshold 304 at a visible edge of the 3D virtual gaming world interface 300 as shown in FIG. 3C. A control cursor that overcomes a scrolling threshold, scrolls the 3D virtual gaming world such that a previously hidden portion of the 3D virtual gaming world adjacent to the visible edge of the 3D virtual gaming world becomes unhidden. In other words, the computing system translates the relative position of the hand joint as a gestured control and scrolls to view a different area of the virtual world. As shown, at least some portion of right control cursor 82 may reach right scrolling threshold 304 in order to initiate the scroll control to the right.

Overcoming a scrolling threshold may include detecting a predetermined distance (e.g. number of pixels) beyond the scrolling threshold. Further, a scrolling speed may be proportional to the distance beyond the scrolling threshold, wherein a greater distance may correspond to a faster scrolling speed, whereas a lesser distance may correspond to a slower scrolling speed. As another example, determining a scrolling speed may include detecting a velocity of a hand joint reaching the scrolling threshold. While scrolling threshold 304 is illustrated in FIG. 3C, it will be understood that the threshold may be implemented without a corresponding visual indicator.

In some embodiments, the posture of one or more hands may contribute to a scrolling gesture or other computer control. For example, in some embodiments, a position and gesture of a hand joint may cause an interface to scroll if the hand has a particular posture, but the same position and gesture of the hand joint may not cause the interface to scroll if the hand has a different hand posture. In the non-limiting example of FIGS. 3A-3C, an open hand posture enables scrolling. For example, at time $t_1$, FIG. 3A shows right hand 92 with an open hand posture. Therefore, as shown in FIG. 3C, 3D virtual gaming world interface 300 may scroll in a corresponding manner to the right, as described above. While hand posture may contribute to scrolling and/or other controls in some embodiments, hand posture may not be considered in some embodiments. For example. In some embodiments, an interface may scroll responsive to hand joint position alone without considering hand posture, The posture of a hand may be determined in any suitable manner. In some embodiments, a hand may be modeled with enough skeletal joints to recognize the posture of the hand from the skeletal data alone. In some embodiments, the position of the hand joint may be used to locate the position of the hand in the corresponding depth map and/or corresponding color image, in such cases, the portion of the depth map and/or color image including the hand may then be evaluated to determine if the hand is in an open or closed posture. For example, the portion of the depth map and/or color image including the hand may be analyzed with reference to a prior trained collection of known hand postures to find a best match hand posture.

As another scrolling gesture example, at time $t_2$ of FIG. 3A, the virtual skeleton 46 moves right hand joint 72 and left hand joint 74 up and on a plane substantially close to head joint 44. In FIG. 3D, which corresponds to time $t_2$ of FIG. 3A, such a gestured, control may be interpreted as panning 3D virtual gaming world interface 300 up. As shown, at least some portion of right control cursor 82 and left control cursor 84 may reach upper scrolling threshold 306 in order to initiate a control to pan 3D virtual gaming world interlace 300 up. In another example, either a left hand or a right hand acting alone may be interpreted as a scroll up control. Further, the posture of right hand 92 and left hand 94 corresponding to right hand, joint 72 and left hand joint 74 may contribute to the scrolling gesture. For example, at time $t_2$, FIG 3A. shows right hand 92 and left hand 94 having an open hand posture. However, it will be appreciated that other hand postures may contribute to a scrolling gesture.

While a hand joint is provided as one example, it will be understood that other skeletal joints may work equivalently well in the translation, of panning the view of a virtual world. In some embodiments, the position, velocity, and/or other attributes of one or more joints may be taken into consideration.

As introduced above, the virtual skeleton models a corresponding movement of a game player (e.g. human target 32 of FIG. 1). As such, the modeling of the game player with the virtual skeleton and the translation of skeletal movements to game actions (e.g., scrolling the view) allows the game player to control the game with bodily movements and gestures.

FIG. 4A shows an example skeletal zoom-in gesture for a gestured, magnify view control. At time $t_0$, virtual, skeleton 46 is in a neutral, position, resulting in 3D virtual gaming world interface 400 as shown in FIG. 4B. At time $t_1$, virtual skeleton 46 brings right hand joint 72 and left hand joint 74 in front of torso 48. In other words, right hand joint 72 and left hand joint 74 may be closer to a depth camera than torso 48. FIG. 4C, which corresponds to time $t_1$, may show right control cursor 82 and left control cursor 84 modeled from right hand joint 72 and left hand joint 74 respectively.

At time $t_2$, virtual skeleton 46 separates right hand joint 72 and left hand joint 74 such that right hand joint 72 and left hand joint 74 move apart and away from torso 48. Such a movement may be translated as a zoom-in gesture. The computing system may be configured to translate the zoom-in gesture into a gestured magnify view control and magnify a view of the 3D virtual gaming world interface 400, as shown in FIG. 4D. In other words, the screen space position of the right control cursor and the screen space position of the left control cursor move apart as a view of the 3D virtual gaming world magnifies.

While moving a right hand joint and a left hand joint apart is provided as one example of a zoom-in gesture, other gestures may be translated to magnify the view of a virtual world, and the gesture illustrated in FIG. 4A is provided, as one non-limiting example. Further, the posture of a right hand 92 and/or a left hand 94 may contribute to a zoom-in gesture. For example, FIG. 4A shows right hand 92 and left hand 94 as a closed fist, although other postures may contribute to the zoom-in gesture. It will be appreciated that one or more other joints may be used for a zoom-in gesture and may be translated into a gestured magnify view control.

Figure 5A:
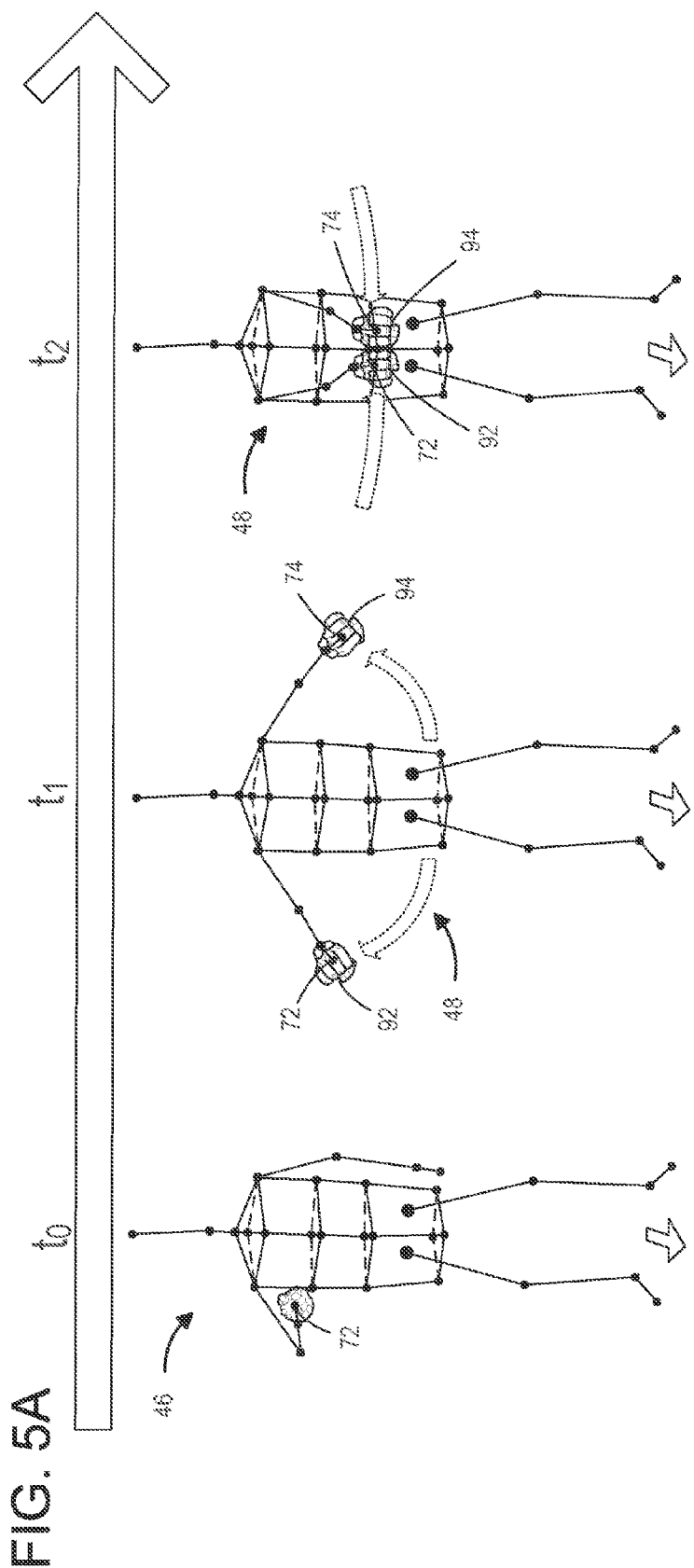
Figure 5B:
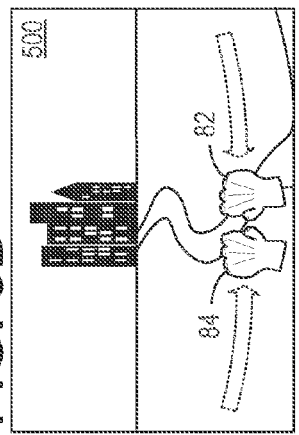
Figure 5C:
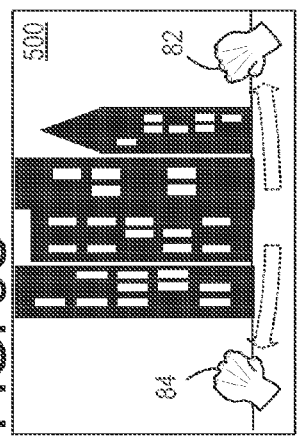

FIG. 5A shows an example skeletal zoom-out gesture tor a gestured shrink view control. At time $t_0$, virtual skeleton 46 is in a neutral position, resulting in 3D virtual, gaming world interface 500 as shown in FIG. 5B. At time $t_1$, virtual skeleton 46 moves right hand joint 72 and left hand joint 74 out from torso 48. FIG 5C, which corresponds to time $t_1$, may show right control cursor 82 and left control cursor 84 modeled from right hand joint 72 and left hand joint 74 respectively.

Figure 5D:
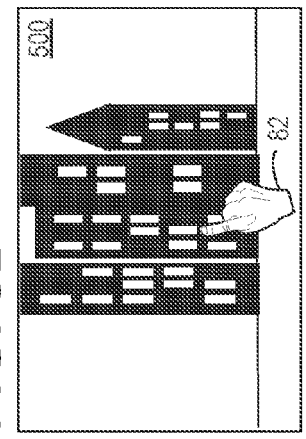

At time $t_2$, virtual skeleton 46 moves right hand joint 72 and left hand joint 74 together such that right hand joint 72 and left hand joint 74 are positioned in front of torso 48. Such a movement may be translated as a zoom-out gesture. The computing system may be configured to translate the zoom-out gesture into a gestured shrink view control and shrink a view of the 3D virtual gaming world interface 500 in response to the gestured shrink view control, as shown in FIG. 5D. In other words, the screen space position of the right control cursor and the screen space position of the left control cursor move together as a view of the 3D virtual gaming world shrinks.

While moving a right hand joint and a left hand joint together is provided, as one example of a zoom-out gesture, other gestures may be translated to shrink the view of a virtual world, and the gesture illustrated in FIG. 5A is provided, as one non-limiting example. Further, the posture of a right hand 92 and/or a left hand 94 may contribute to a zoom-out gesture. For example, FIG. 5A shows right hand 92 and left hand 94 as a closed, fist, although other postures may contribute to the zoom-out gesture. It will be appreciated that one or more other joints may be used for a zoom-out gesture and may be translated into a gestured shrink view control.

FIG. 6A shows an example skeletal gesture for locking a control cursor to an object in the screen space position of the 3D virtual gaming world. At time $t_0$, virtual skeleton 46 is in a neutral position, resulting in 3D virtual gaming world, interface 600 as shown in FIG. 6B. At time $t_1$, the virtual skeleton 46 reaches right hand joint 72 towards a .a object 40 displayed on a display device (e.g., display device 16 of FIG. 1). At time $t_1$, the right hand 92 modeled by the right hand joint 72 has an open posture. Such an open posture may be modeled by right control cursor 82 as shown in FIG. 6C. At time $t_2$, the right hand 92 modeled by the right hand joint 72 closes in a grabbing motion. The computing system may be configured to lock a control cursor to an object responsive to a grabbing hand posture. For example, right control cursor 82 may be locked to object 40, as shown in FIG. 6D.

Right control cursor 82 may be locked to object 40 in the 3D virtual gaming world if a grab threshold 602 of the object is overcome. As an example, the world space parameters of the hand may overcome the grab threshold of the object if the hand is closed by the user when the cursor is sufficiently close to object 40. For example, the user may close his or her hand when the cursor occupies the same screen space coordinates as the object in order to lock the cursor to the object.

As another example, the world space parameters of the hand may overcome the grab threshold of the object if a screen space position of the hand, as visualized by the cursor, is within a threshold distance of the object for a duration threshold. For example, the user may move his hand in world space so that the screen space position of the cursor is within a threshold distance of the screen space position of the object. Once the cursor has been within the threshold distance for longer than the duration threshold, the cursor, and thus the hand of the user, is locked to the object.

As yet another example, the world space parameters of the hand may overcome the grab threshold of the object if the screen space position of the hand is with a threshold distance of the object and a speed of the hand is less than a speed threshold for a duration threshold. For example, the user may move his or her hand in world space such that when the cursor is within a threshold distance of the object, the speed at which the hand moves slows down. When the speed of the hand is below the speed threshold for longer than the duration threshold (e.g., the cursor is hovering over the object), the cursor, and thus the hand of the user, is locked to the object.

It will be appreciated that other joints and/or other postures of those joints may be modeled as a control cursor and may be locked to an object when a grab threshold of the object is overcome.

Gestures performed by a game player (e.g., human target 32 of FIG. 1) may be used to control the movement of an object within a 3D virtual gaming world when a control cursor is locked to the object. In other words, gestures may be used to move the object forward, backward, left, right, up, down, etc., such that the control cursor and the object move as a unit. Furthermore, gestures may be used to rotate the object, change the scale of the object, or otherwise control the object.

For example, FIG. 7A shows an example of moving a control cursor locked to an object and releasing the object from the control cursor. At time $t_0$, virtual skeleton 46 has already grabbed an object as described above. As such, right control cursor 82 is locked to object 40 in FIG. 7B. At time $t_1$, virtual skeleton 46 moves a right arm including right hand joint 72 down and to the left. As such, right control cursor 82, which is locked to object 40, moves down and to the left as shown in FIG. 7C. In this way, a control cursor locked to an object may move the object with the control cursor such that the world space position of the corresponding hand of the human target moves the object in the 3D virtual gaming world.

As another moving gesture example, virtual skeleton 46 may move a right arm including right hand joint 72 to the right, as shown at time $t_2$. As such, right control cursor 82 and object 40 move to the right m If a game player (e.g. human target 32 of FIG. 1) is satisfied with the position of an object, the object may be unlocked from the control cursor. For example, FIG. 7A at time $t_3$ shows virtual skeleton 46 with right hand joint 72 modeled by right hand 92 with an open posture. Such a gesture may be translated as an unlocking gesture, thus releasing object 40 from right control cursor 82, as shown in FIG. 7E.

An object may be released within, a 3D virtual gaming world if a release threshold 702 of the object is overcome. For example, the world space parameters of the hand may overcome the release threshold of the object when the user opens his hand, as shown in FIG. 7E, As another example, the world space parameters of the hand may overcome the release threshold of the object if the non-grabbing band (e.g., the left hand) performs a release gesture.

FIG. 8A shows an example skeletal gesture for rotating an object in a 3D virtual gaming world. At time $t_0$, virtual skeleton 46 has already grabbed an object as described above. As such, right control cursor 82 is locked to object 40 in FIG. 8B. At time $t_1$, virtual skeleton 46 rotates right arm including right hand joint 72 to the left. In other words, right hand joint 72 rotates inward, towards torso 48. Such a movement may be translated as a rotation gesture. As illustrated in 3D virtual gaming world interface 800 of FIG. 8C, right control cursor 82 locked to object 40 rotates to the left responsive to the rotation gesture of virtual skeleton 48 at time $t_1$. In other words, the world space gesture of the human target rotates the object in the 3D virtual gaming world. At time $t_2$, if satisfied with the position of the object, the game player may release the object from the control cursor by performing an unlocking gesture.

Figure 9A:
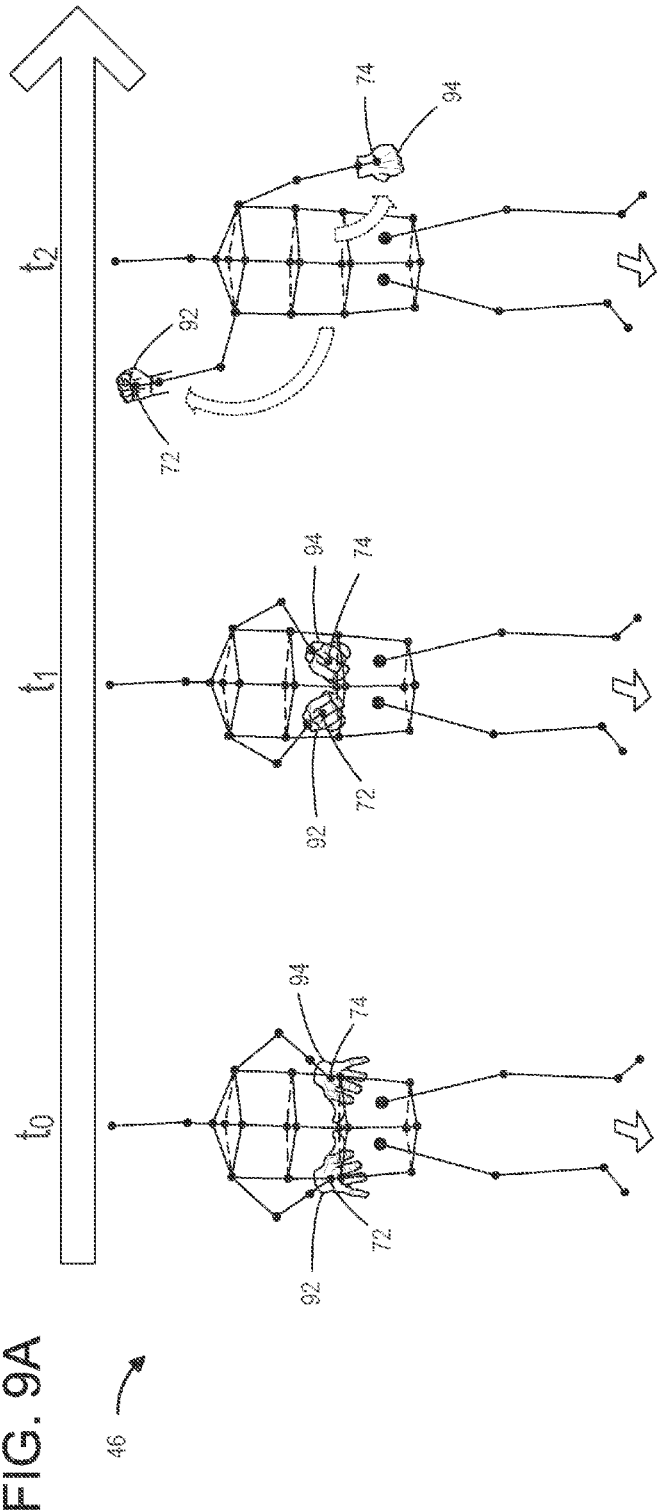
Figure 9B:
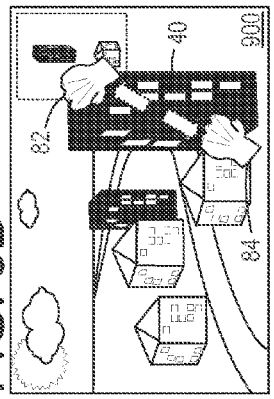
Figure 9C:
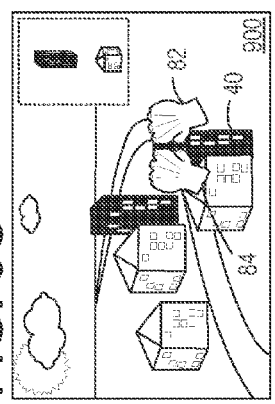
Figure 9D:
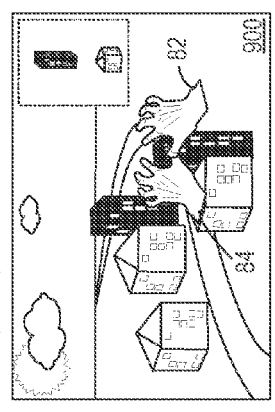

FIG. 9A shows an example skeletal gesture for scaling an object in a 3D virtual gaming world. At time $t_0$, virtual skeleton 46 is shown with right hand joint 72 and left hand joint 74 modeled by right hand 92 and left hand 94, respectively, in the open posture. FIG. 9B shows 3D virtual gaming world interface 900 corresponding to time to. At time G, right hand 92 and left hand 94 move to a closed posture. As such, right control cursor 82 and left control cursor 84 lock to object 40 as shown in FIG. 9C. At time $t_2$, right hand joint 72 moves up and to the right while left hand joint 74 moves down and to the left. Such a movement may be translated as a scale gesture. The scale of an object in the 3D virtual gaming world may change responsive to a scale gesture of the virtual skeleton such that the world space gesture of the human target scales the object in the 3D virtual gaming world. As shown in FIG. 9D, object 40 becomes larger in response to the scale gesture.

As another example, an object may be scaled such that the object becomes smaller if the object is grabbed initially with a right hand joint and a left hand joint substantially apart, thus permitting a right hand joint and a left hand joint to move towards each other to perform a scale gesture.

In some scenarios, a game player may select a plurality of objects in the 3D virtual gaming world, thus locking a control cursor to the plurality of objects. Further, gestures modeled by a virtual skeleton may control the plurality of objects by moving, rotating and scaling the objects, similar to the above gestures described for moving, rotating and scaling one object.

For example, FIG. 10A shows an example skeletal gesture for selecting a plurality of objects. At time $t_0$, virtual skeleton 46 is in a neutral position, resulting in 3D virtual gaming world interface 100 as shown in FIG. 10B. At time $t_1$, virtual skeleton 46 is shown with right hand joint 72 moving in a circle such that a plurality of objects 38 are circled by right control cursor 82, as illustrated in FIG. 10C. Such a movement may be translated as a selection gesture and the 3D virtual gaming world interface may include an indication of the selected plurality of objects. For example, FIG. 10C shows a dashed line enclosing the selected plurality of objects. At $t_2$, virtual skeleton 46 may grab the plurality of objects 38 by changing the posture of right hand 92 to a closed posture, as described above. Thus, the plurality of objects 38 may be locked to right control cursor 82 as shown in FIG. 10D. In other words, a plurality of objects may be locked to a control cursor in the 3D virtual gaming world if a grab threshold of the plurality of objects is overcome. Further, the 3D virtual gaming world interface 100 may include an indication that the plurality of objects 38 are locked to right control cursor 82. For example, FIG. 10D shows a solid line enclosing the selected plurality of objects 38.

Figure 11A:
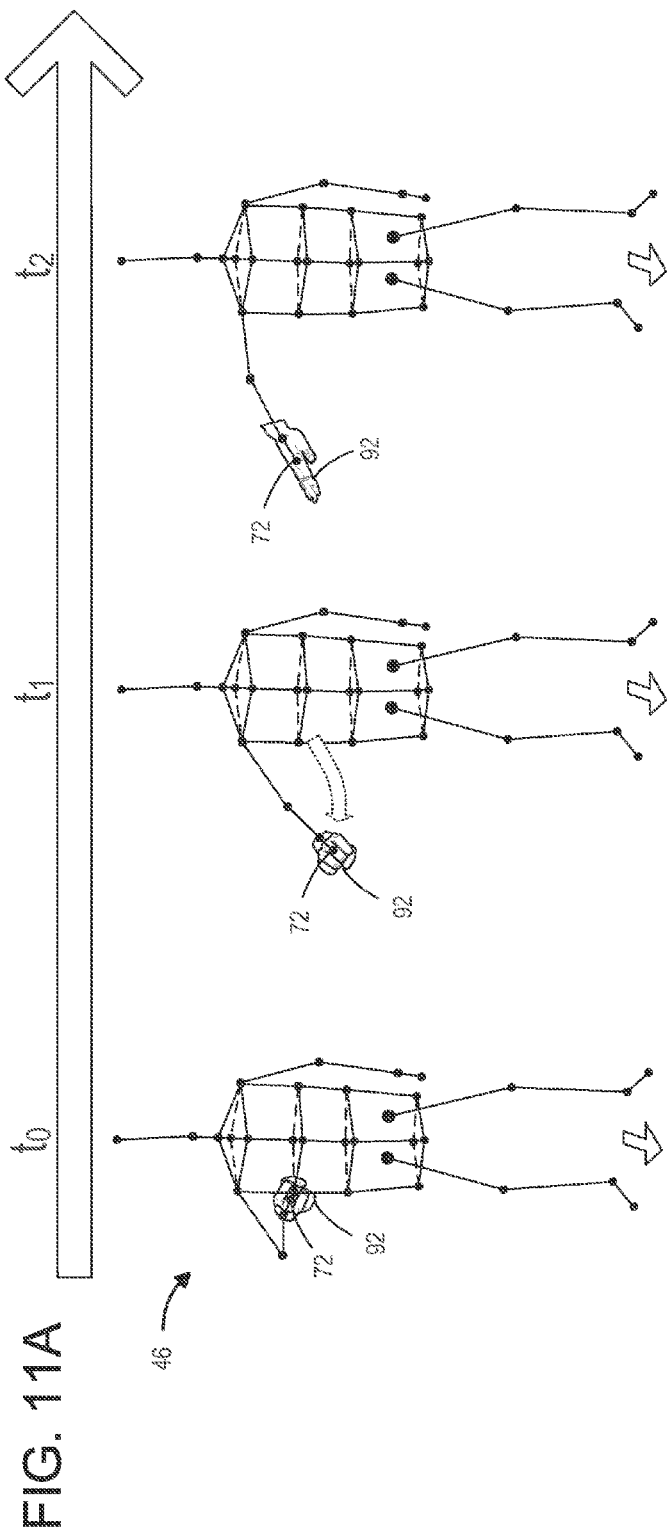
Figure 11D:
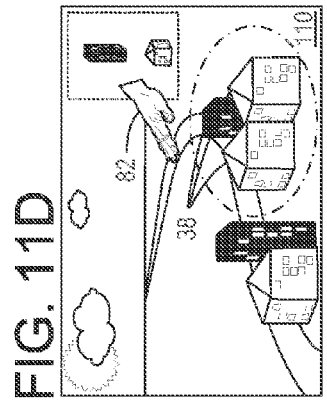
Figure 11C:
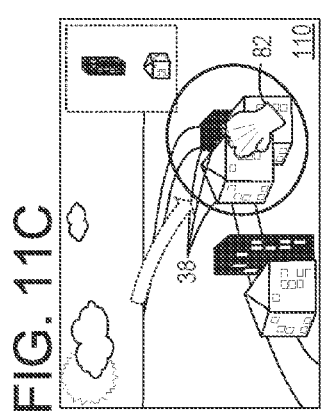
Figure 11B:
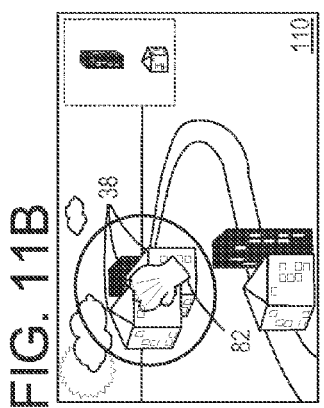

When locked, a plurality of objects may be moved in the 3D virtual gaming world, similar to the above description for moving one object. For example, FIG. 11B, representing virtual skeleton 46 of FIG. 11A, shows a plurality of objects 38 locked to right control, cursor 82 at time $t_0$. At time $t_1$, virtual skeleton 46 moves right hand joint 72 to the right. As a result, right control cursor 82 moves to the right as shown in FIG. 11C. The plurality of objects move with the control cursor such that the world, space position of the corresponding hand of the human target moves the plurality of objects in the 3D virtual gaming world. At tune $t_2$, virtual skeleton 46 releases the plurality of objects 38 with an unlocking gesture. The plurality of objects may be released responsive to a hand overcoming a release threshold of the plurality of objects.

FIG. 12A shows an example skeletal gesture for rotating a plurality of objects in a 3D virtual gaming world. At time $t_0$, virtual skeleton 46 has grabbed a plurality of objects. As such, right control cursor 82 is locked to the plurality of objects 38 as shown in FIG. 12B. At time $t_1$, virtual skeleton 46 rotates a right arm including right hand joint 72 to the left. In other words, right hand joint 72 rotates inward, towards torso 48. Such a movement may be translated as a rotation gesture. As illustrated in 3D virtual gaming world interface 120 of FIG. 12C, right control cursor 82 and plurality of objects 38 rotates to the left responsive to the rotation gesture of virtual skeleton 46 at time $t_1$. In other words, the world space gesture of the human target rotates the plurality of objects in the 3D virtual gaming world. At time $t_2$, if satisfied with the position of the plurality of objects, the game player may release the plurality of objects from the control cursor by performing an unlocking gesture.

FIG. 13 shows an example skeletal gesture for scaling a plurality of objects in a 3D virtual gaming world. At time $t_0$, virtual skeleton 46 is shown with right hand joint 72 and left hand joint 74 modeled by right hand 92 and left hand 94, respectively, in the open posture. FIG. 13B shows 3D virtual gaming world interface 130 corresponding to time to. At time $t_1$, right hand 92 and left hand 94 move to a closed posture. As such, the right control cursor 82 and the left control cursor 84 are locked to the plurality of objects 38 as shown in FIG. 13C. At time $t_2$, right hand joint 72 moves up and to the right while left hand joint 74 moves down and to the left. Such, a movement may be translated as a scale gesture. The world space gesture of the human target scales the plurality of objects in the 3D virtual gaming world. As shown in FIG. 13D corresponding to time U the plurality of objects 38 become larger as a collective unit in response to the scale gesture. As another example, the plurality of objects may be scaled such that the objects become smaller.

The above described gesture/controls are non-limiting examples. Other gestures and controls are within the scope of this disclosure. Furthermore, two or more of the above described gestures may be simultaneously executed and translated.

In some embodiments, one or more gestures may be modal—i.e., the same gesture may produce different results depending on the mode of the system. In some scenarios, a first input modality may be set responsive to recognising a first mode initiation gesture of the virtual skeleton. For example, a first input modality may be set by a gesture including the virtual skeleton tapping a left thigh with a left hand.

While the first input modality is set, a specific action gesture of the virtual skeleton may be interpreted as a first gesture control. For example, the first input modality may be a troop-command modality, and the first gesture may be a grab gesture that picks up troops and moves them to a desired battle position.

A second input modality may be set responsive to recognizing a second mode initiation gesture of the virtual skeleton. For example, the second input modality may be set by a gesture including the virtual skeleton tapping a left shoulder with a left hand.

While the second input modality is set, the same specific action gesture of the virtual skeleton may be interpreted as a second gesture control, different than the first gesture control. In other words, the first gesture control and the second gesture control may produce different controls of the three-dimensional virtual world. Continuing with the above example, the second input modality may be a statistics modality, and the same grab gesture used to pick up and move troops in the first modality may instead be used to display battle statistics of the troops in the second modality.

In some embodiments, one or more gestures may be contextual—i.e., the same gesture may produce different results depending on the portion of the screen and/or virtual target to which the gesture is directed. For example, making a specific gesture while grabbing a building may cause the building to begin producing resources, while making the same specific gesture while grabbing a soldier may cause the soldier to attack. Similarly, different types of targets on the screen and/or the same type of target at different locations on the screen may respond differently to the same type of gestural pointing.

While described with reference to a god game, the gestures described above may be applied to other games or applications. Furthermore, the gestures described above may be used to control, physical objects, such as robots.

While the gestures described above are described with reference to the visual representation of the virtual skeletons, it is to be understood that the gestures may be analyzed with reference to the skeletal data that constitutes the virtual skeleton. Each gesture may be analyzed using one or more tests. Each such test may consider the position, velocity, acceleration, orientation, or other attributes of one or more joints. Such attributes may be considered in an absolute sense, or with reference to one or more other joints. As non-limiting examples, a gesture may be identified by the absolute position of a joint, the relative positions of two or more joints with respect to one another, the angle of a bone segment connecting two joints relative to the angle of another bone segment connecting two joints, and/or a combination of the above or other attributes.

In some embodiments, the above described methods and processes may be tied to a computing system including one or more computers. In particular, the methods and processes described herein may be implemented as a computer application, computer service, computer API, computer library, and/or other computer program product.

Figure 14:
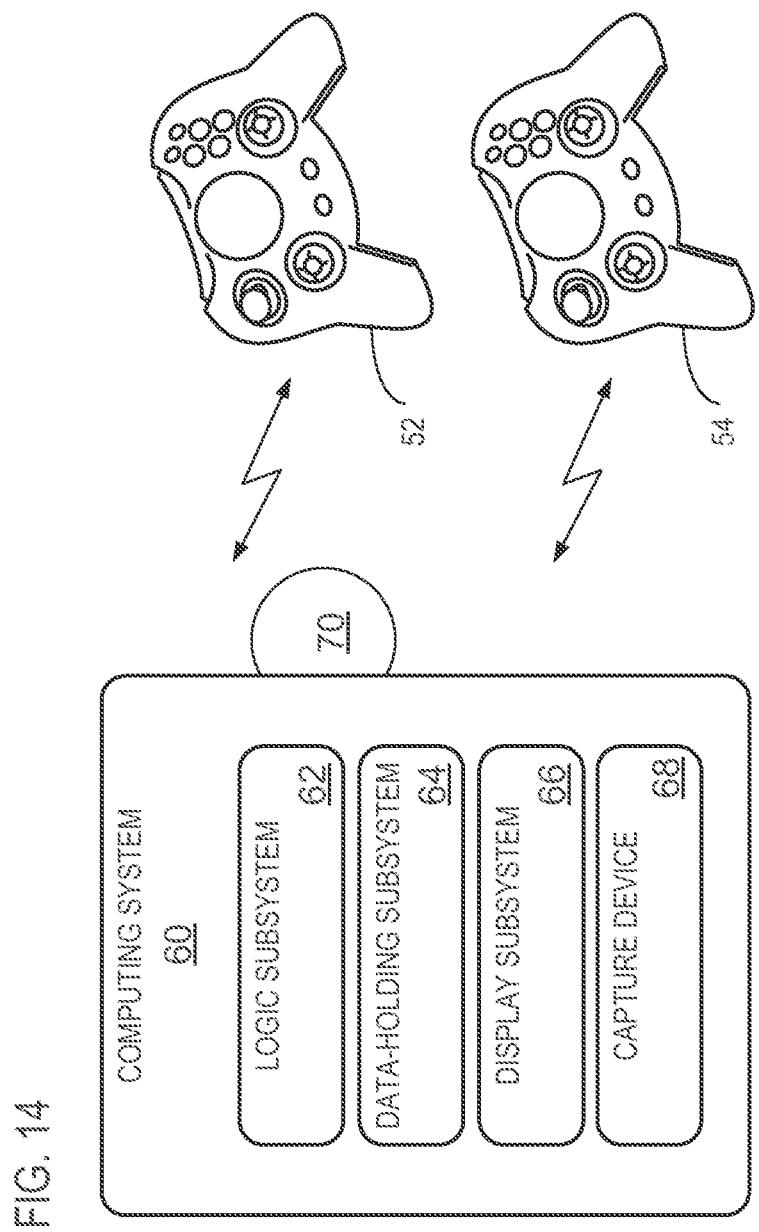
FIG. 14 schematically shows a computing system configured to translate a virtual skeleton into gestured god game controls.

FIG. 14 schematically shows a non-limiting computing system 60 that may perform one or more of the above described methods and processes. Computing system 60 is shown in simplified form. It is to be understood that virtually any computer architecture may be used without departing from the scope of this disclosure. In different embodiments, computing system 60 may take the form of a mainframe computer, server computer, desktop computer, laptop computer, tablet computer, home entertainment computer, network computing device, mobile computing device, mobile communication device, gaming device, etc.

Computing system 60 includes a logic subsystem 62 and a data-holding subsystem 64. Computing system 60 may optionally include a display subsystem 66, capture device 68, and/or other components not shown in FIG. 14. Computing system 60 may also optionally include user input devices such as keyboards, mice, game controllers, cameras, microphones, and/or touch screens, for example.

Logic subsystem 62 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured, to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualised and executed by remotely accessible networked computing devices configured in a cloud computing configuration.

Data-holding subsystem 84 may include one or more physical, non-transitory, devices configured to hold data and/or instructions executable by the logic subsystem to implement the herein described methods and processes. When such methods and processes are implemented, the state of data-holding subsystem 64 may be transformed (e.g., to hold different data).

Data-holding subsystem 84 may include removable media and/or built-in devices. Data-holding subsystem 64 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 64 may include devices with, one or more of the following characteristics: volatile, nonvolatile, dynamic, static, read/write, read-only, random access, sequential access, location addressable, file addressable, and content addressable. In some embodiments, logic subsystem 62 and data-holding subsystem 64 may be integrated into one or more common devices, such as an application specific integrated circuit or a system on a chip.

FIG. 14 also shows an aspect of the data-holding subsystem in the form of removable computer-readable storage media 70, which may be used to store and/or transfer data and/or instructions executable to implement the herein described methods and processes. Removable computer-readable storage media 70 may take the form of CDs, DVDs, HD-DVDs, Blu-Ray Discs, EEPROMs, and/or floppy disks, among others, It is to be appreciated that data-holding subsystem 64 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 66 may be used to present a visual representation of data held by data-holding subsystem 64 (e.g., a virtual avatar and/or a three-dimensional virtual world). As the herein described, methods and processes change the data held by the data-holding subsystem, and thus transform the state of the data-holding subsystem, the state of display subsystem 66 may likewise be transformed to visually represent changes in the underlying data. For example, computing system 60 may be configured to render a driving game for display on a display device of display subsystem 66. As such, computing system 60 may include a display output to output the driving game interlace to the display device. Display subsystem 66 may include one or more display devices utilizing virtually any type of technology. Such display devices may be combined with logic subsystem 62 and/or data-holding subsystem 64 in a shared enclosure, or such display devices may be peripheral display devices connected to the logic subsystem via a display output.

When included, a communication subsystem may be configured to communicatively couple computing system 60 with one or more other computing devices. The communication, subsystem may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 60 to send and/or receive messages to and/or from other devices via a network such, as the Internet.

Computing system 60 further may include an integrated and/or peripheral capture device 68 configured to obtain depth-images of one or more targets. In either case, computing system 60 may include a peripheral input to receive depth images from a depth camera and deliver the received depth images to the logic subsystem for processing. Capture device 68 may be configured to capture video with depth information via any suitable technique (e.g., time-of-light, structured light, stereo image, etc.). As such, capture device 68 may include a depth camera, a video camera, stereo cameras, and/or other suitable capture devices.

For example, in time-of-flight analysis, the capture device 68 may emit infrared light to the target and may then use sensors to detect the backscattered light from the surface of the target. In some cases, pulsed infrared light may be used, wherein the time between aa outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 68 to capture depth, information. In such an analysis, patterned light (i.e., light displayed as a known pattern such as grid pattern, a stripe pattern, a constellation of dots, etc) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth-image.

In other embodiments, capture device 68 may utilize other technologies to measure and/or calculate depth values. Additionally, capture device 68 may organize the calculated depth information into "Z layers," i.e., layers perpendicular to a Z axis extending from the depth camera along its line of sight to the target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic. Computing system 80 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc, which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, franking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data holding device holding instructions executable by a logic device, the instructions comprising:
   instructions to render a three-dimensional virtual gaming world for display on a display device;
   instructions to receive a machine-readable virtual skeleton structurally representing a human being sighted by a depth camera in a volume large enough to envelop the human being, the virtual skeleton including a hand joint position in three dimensions corresponding to a position of a hand of the human being;
   instructions to render a control cursor for display on the display device, a screen position of the control cursor tracking the hand joint position;
   instructions to lock the control cursor to an object in the three-dimensional virtual gaming world if a grab threshold of the object is overcome;
   instructions to, when the control cursor is locked to the object, move the object in all three dimensions to track the hand joint position anywhere in the volume, such that movement of the hand effects a corresponding movement of the object in the three-dimensional virtual gaming world; and
   instructions to unlock the control cursor from the object at a release position of the object within the three-dimensional virtual gaming world if a release threshold of the object is overcome.

2. The data holding device of claim 1, where the grab threshold of the object is overcome if the hand is closed.

3. The data holding device of claim 1, where the grab threshold of the object is overcome if the hand is within a threshold distance of the object for a threshold duration.

4. The data holding device of claim 1, where the grab threshold of the object is overcome if the hand is within a threshold distance of the object and a speed of the hand is below a threshold speed for a threshold duration.

5. The data holding device of claim 1, where the release threshold is overcome if the hand is open.

6. The data holding device of claim 1, wherein the instructions further comprise:
   instructions to, when the control cursor is locked to the object, rotate the object in the three-dimensional virtual gaming world responsive to a rotation gesture of the virtual skeleton.

7. The data holding device of claim 1, wherein the instructions further comprise:
   instructions to, when the control cursor is locked to the object, scale the object in the three-dimensional virtual gaming world responsive to a scale gesture of the virtual skeleton.

8. The data holding device of claim 1, wherein the object is one of a plurality of objects in the three-dimensional virtual gaming world selected responsive to a selection gesture of the virtual skeleton, and wherein the instructions further comprise:
   instructions to lock the control cursor to the plurality of objects if a grab threshold of the plurality of objects is overcome;
   instructions to, when the control cursor is locked to the plurality of objects, move the plurality of objects in all three dimensions to track the hand joint position, such that movement of the hand effects a corresponding movement of the plurality of objects in the three-dimensional virtual gaming world; and
   instructions to unlock the control cursor from the plurality of objects if a release threshold of the plurality of objects is overcome.

9. The data holding device of claim 8, wherein the instructions further comprise:
   instructions to, when the control cursor is locked to the plurality of objects, rotate the plurality of objects in the three-dimensional virtual gaming world responsive to a rotation gesture of the virtual skeleton.

10. The data holding device of claim 8, wherein the instructions further comprise:
    instructions to, when the control cursor is locked to the plurality of objects, scale the plurality of objects in the three-dimensional virtual gaming world responsive to a scale gesture of the virtual skeleton.

11. The data holding device of claim 1, wherein the instructions further comprise:
    instructions to recognize a zoom-in gesture in which right and left hands of the human being are separated; and
    instructions to magnify a view of the three-dimensional virtual gaming world on the display responsive to the zoom-in gesture.

12. A data holding device holding instructions executable by a logic device, the instructions comprising:
    instructions to render a three-dimensional virtual gaming world for display on a display device;
    instructions to receive a machine-readable virtual skeleton structurally representing a human being sighted by a depth camera, the virtual skeleton including a hand joint position in three dimensions corresponding to a position of a hand of the human being;
    instructions to render a control cursor as a human-hand image for display on the display device, a screen position of the control cursor tracking the hand joint position;
    instructions to lock the control cursor to an object in the three-dimensional virtual gaming world if a grab threshold of the object is overcome, where the control cursor when locked to the object is rendered closed on the object;
    instructions to, when the control cursor is locked to the object, move the object in all three dimensions to track the hand joint position, such that movement of the hand effects a corresponding movement of the object in the three-dimensional virtual gaming world;
    instructions to unlock the control cursor from the object at a release position of the object within the three-dimensional virtual gaming world if a release threshold of the object is overcome, where the control cursor when unlocked from the object is rendered reopened; and
    instructions to, responsive to the screen position of the control cursor reaching a scrolling threshold at a visible edge of the three-dimensional virtual gaming world, scrolling the three-dimensional virtual gaming world such that a previously hidden portion of the three-dimensional virtual gaming world adjacent to the visible edge of the three-dimensional virtual gaming world becomes unhidden.

13. The data holding device of claim 12 wherein the instructions further comprise:
    instructions to recognize a zoom-out gesture in which right and left hands of the human being are brought closer; and
    instructions to demagnify a view of the three-dimensional virtual gaming world on the display responsive to the zoom-out gesture.

14. A data holding device holding instructions executable by a logic device, the instructions comprising:
    instructions to render a three-dimensional virtual gaming world for display on a display device;
    instructions to receive a machine-readable virtual skeleton structurally representing a human being sighted by a depth camera, the virtual skeleton including a hand joint position in three dimensions corresponding to a position of a hand of the human being;
    instructions to render a visually closable control cursor for display on the display device, a screen position of the control cursor tracking the hand joint position;
    instructions to lock the control cursor to an object in the three-dimensional virtual gaming world if a grab threshold of the object is overcome, where the control cursor when locked to the object is rendered closed on the object;
    instructions to, when the control cursor is locked to the object, move the object in all three dimensions to track the hand joint position, such that movement of the hand effects a corresponding movement of the object in the three-dimensional virtual gaming world; and
    instructions to unlock the control cursor from the object at a release position of the object within the three-dimensional virtual gaming world if a release threshold of the object is overcome, where the control cursor when unlocked from the object is rendered reopened.

15. The data holding device of claim 14 wherein the instructions further comprise:
    instructions to, responsive to recognizing a first mode initiation gesture of the virtual skeleton, set a first input modality;
    instructions to, while the first input modality is set, interpret a specific action gesture of the virtual skeleton as a first gesture control;
    instructions to, responsive to recognizing a second mode initiation gesture of the virtual skeleton, set a second input modality; and instructions to, while the second input modality is set, interpret the specific action gesture of the virtual skeleton as a second gesture control, the first gesture control and the second gesture control producing different controls of the three-dimensional virtual world.

\* \* \* \* \*